Sept. 18, 1934. P. J. SENTNER ET AL 1,974,163
COLLAPSIBLE RUNNER
Filed March 7, 1932  2 Sheets-Sheet 2

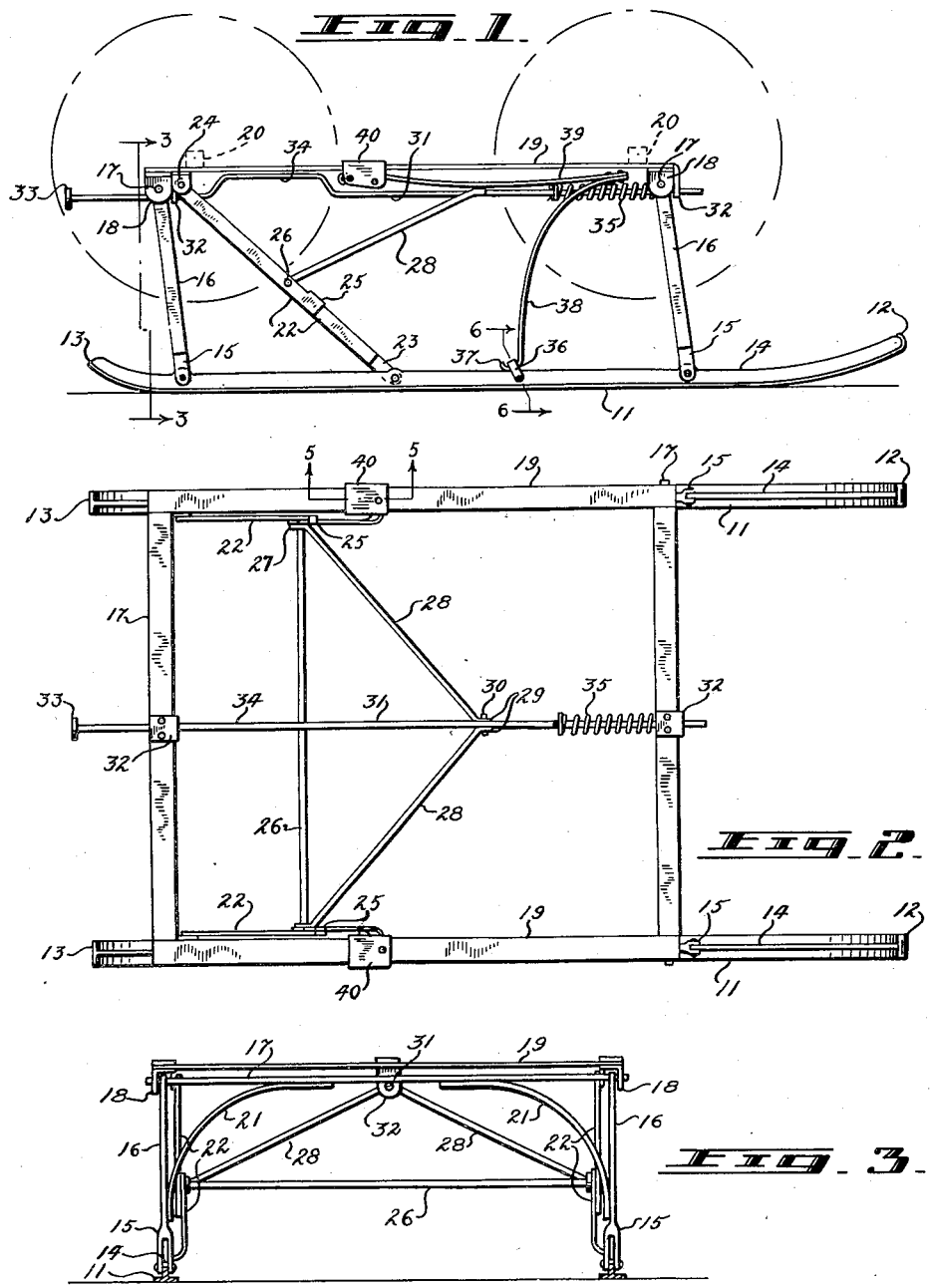

INVENTORS
John Angus Weir &
Preston James Sentner
BY
ATTORNEY

Patented Sept. 18, 1934

1,974,163

UNITED STATES PATENT OFFICE 1,974,163

COLLAPSIBLE RUNNER

Preston James Sentner and John Angus Weir, Charlottetown, Prince Edward Island, Canada Application March 7, 1932, Serial No. 597,394

4 Claims. (Cl. 280—11)

This present invention relates to certain new and useful improvements in collapsible runners.

The primary object of the invention resides in the provision of collapsible runners which are particularly designed for baby carriages but may be employed on various vehicles, aeroplanes and the like.

Another object of the invention resides in the provision of collapsible runners of the character stated which are of generally improved and simplified construction and increased efficiency and it may be readily collapsed beneath the body of the vehicle, aeroplane or the like or extended for use, as desired.

The invention has for a still further object the provision of collapsible runners of the character stated which will be firmly supported when in extended position and will be firmly locked against accidental collapsing.

The invention has for a still further object the provision of collapsible runners of the character stated which may be readily mounted beneath the baby carriage, other vehicle, aeroplane or the like without requiring alterations in the construction thereof and which will not interfere with use of the wheels of the vehicle when the runners are in collapsed condition.

A still further object of the invention resides in the provision of collapsible runners of the character stated which may be readily manufactured at small cost and retailed at a popular price with good profit or may be provided on new baby carriages or other vehicles, aeroplanes and the like during manufacture thereof without materially increasing the cost of production, thus providing a commercially attractive proposition.

To the accomplishment of these and related objects as shall become apparent as the description proceeds, the invention resides in the construction, conbination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:—

Figure 1 is a side elevation of the collapsible runners as provided for a baby carriage or the like;

Figure 2 is a top plan view thereof;

Figure 3 is a transverse vertical section taken substantially on the plane of line 3—3 of Figure 1, looking in the direction indicated by the arrows.

Figure 4:
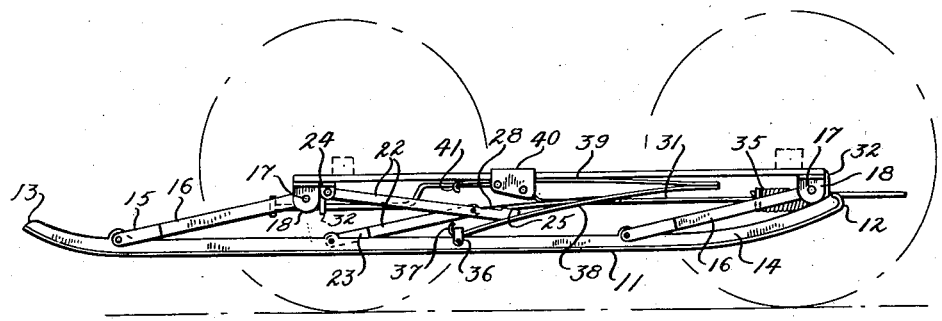
Figure 4 is a side elevation, showing the collapsible runners in collapsed condition.
Figure 5:
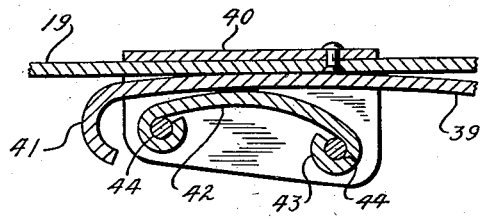
Figure 5 is an enlarged detail section, taken substantially on the plane of line 5—5 of Figure 2, looking in the direction indicated by the arrows.
Figure 6:
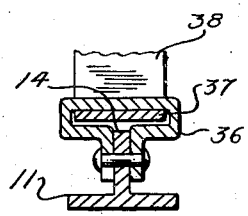
Figure 6 is an enlarged detail section, taken substantially on the plane of line 6—6 of Figure 1, looking in the direction indicated by the arrows.

Referring more in detail to the drawings, it is to be noted that the collapsible runners include a pair of longitudinal runner members 11 which preferably have their forward and rear ends 12 and 13 respectively, curved slightly to prevent them from catching in the snow or ice as the baby carriage is moved forwardly or rearwardly. The runner members 11 are shown as being provided with central longitudinal ribs 14 on their upper faces over which are pivoted the lower bifurcated ends 15 of the forward and rear runner supporting standards 16 which have their upper ends mounted on forward and rear transverse rods 17 carried in depending angular brackets 18 provided on the underface of the rectangular mounting frame 19, at the corners thereof. This rectangular mounting frame 19 is constructed from flat strips of metal or the like and may be readily secured to the underface of the baby carriage axles 20, to the underface of a vehicle body, aeroplane or the like or to any other appropriate underportion thereof, in any suitable and appropriate manner. The standards 16 are braced to the transverse rods 17 by arcuate braces 21.

A pair of toggle arms 22 are employed on each side to connect an intermediate portion of one of the runner members 11 with the rear corner of the mounting frame 19 on that side of the structure. The lower arm of each pair of toggle arms 22 has an offset lower extremity 23 pivoted to the rib 14 of the runner member 11 and the upper end of the upper arm is pivoted to a depending bracket 24 on the underside of the mounting frame 19 near the rear corner thereof. The upper arm also has a laterally extended locking member 25 extending across the front edge of the lower arm, just below the pivotal connection of the toggle arms 22 to lock them in alignment and prevent rearward swinging of the toggle arms on the transverse pivot rod 26 for the two pairs of toggle arms 22. The angularly extended rear ends 27 of forwardly converging rods 28 are mounted on the rod 26 while the forwardly directed forward ends 29 of the converging rods 28 are mounted on the releasing rod 31 by a pivot pin 30, the rods 28 being inclined forwardly. The releasing rod 31 extends longitudinally beneath the center of the mounting frame 19 and is slidable through guides 32 depending from the forward and rear ends of the mounting frame 19. The releasing rod 31 having a head or knob 33 on its projecting rear end and an upwardly offset portion 34 a short distance from its rear end. The rod 31 is resiliently maintained in its rear position by the spring 35 encircling the forward portion thereof with the rear end of the spring 35 fastened on the rod 31 while the forward end of the spring 35 bears against the inner face of the front guide 32 for the rod 31. Pivoted on the rib 14 of each runner member 11 between the lower end 23 of the toggle arms 22 and the bifurcated lower end 15 of the forward standards 16 is a link 36 through which is engaged the turned back lower extremity 37 of a bowed leaf spring 38. The upper end of the bowed leaf spring 38 has firmly fastened thereon the forward end of a substantially straight spring bar 39 which slides through a bracket 40 mounted on and depending from the longitudinal side member of the mounting frame 19, the rear extremity 41 of the straight spring bar 39 being turned under and curved forwardly in the form of a hook. Supported in the bracket 40, beneath the straight spring bar 39 is the arcuate stop 42 slightly inclined rearwardly with its convex face opposed to the underface of the straight spring bar 39, the ends 43 of the arcuate stop 42 being turned around pins 44 extended transversely through the forward and rear lower corners of the bracket 40. This arcuate stop 42 serves to limit forward sliding movement of the flat spring bar 39 in the bracket 40.

As the construction of the device has thus been described in detail brief reference is now had to its use and modus operandi: When the runner members 11 are in position for use, the rod 31 is in its rearward position, the pairs of toggle arms 22 are locked in their rearwardly inclined position, the standards 16 are slightly inclined rearwardly, the straight spring bar 39 is drawn forwardly and the bowed leaf spring 38 is under tension in its fully bowed condition. When it is desired to collapse the runners, it is simply necessary to force the rod 31 forwardly, thus opening the pairs of toggle arms 22 by drawing the rod 26 forwardly through the medium of the rods 28. This also results in compressing and placing under tension the spring 35. When the toggle arms 22 are thus opened and the locking member 25 drawn forwardly, the springs 38 immediately function to swing the runner members 11 and parts connected directly therewith rearwardly and upwardly beneath the mounting frame 19, the springs 38 assuming positions nearly parallel with the straight spring bars 39. To again extend the runner members 11 to functioning position beneath the mounting frame 19, all that is required is to press downwardly on the rear end 13 of one of the runner members 11 until the pairs of toggle arms 22 are returned to their rearwardly inclined and locked positions and the bowed leaf springs 38 are again bowed and under tension, the rearward movement of the rod 31 with the closing of the toggle arms 22 being assisted by action of the spring 35. All of these operative parts remain in set position when the runners are extended or in collapsed position.

From the foregoing description taken in connection with the accompanying drawings, it will be manifest that collapsible runners are provided that will fulfill all the necessary requirements of such a device but as many changes could be made in the above description and many apparently widely different embodiments of our invention may be constructed within the scope of the appended claims without departing from the spirit or scope thereof, it is intended that all matters contained in the said accompanying specification and drawings shall be interpreted as illustrative and not in a limitative or restrictive sense.

Having thus described our invention, what is claimed is:—

1. Collapsible runners including a mounting frame for attachment to a baby carriage, aeroplane or other vehicle; depending standards pivoted to said mounting frame; runner members pivoted on said standards; locking toggle arms extended between said mounting frame and said runner members; a releasing rod slidable beneath said mounting frame; means connected with and operated by said releasing rod to unlock said toggle arms; means to resiliently retain said releasing rod in unoperated position; tensioned means for collapsing said runner members, said standards and said toggle arms beneath said mounting frame when said releasing rod is operated; and guide means for the last mentioned means.

2. Collapsible runners including a mounting frame; pairs of standards depending from said mounting frame and pivoted thereto; connecting and bracing means for said standards; runner members having longitudinal ribs; said standards being pivoted to said ribs; locking rearwardly inclined toggle arms connecting the intermediate portions of said ribs with the rear corners of said mounting frame; each pair of toggle arms being normally locked with the arms in alignment; a releasing rod for said pairs of toggle arms slidable longitudinally beneath said mounting frame; guiding means for said rod; means to normally maintain said releasing rod in unoperated position; and means mounted on said ribs and slidable beneath said mounting frame and normally under tension to cause collapsing of said runner members, said standards and said toggle arms toward the under side of said mounting frame when the said releasing rod is operated.

3. Collapsible runners including a mounting frame for attachment to a vehicle, depending standards pivoted to said mounting frame at one end, runner members pivoted to said standards at their other ends, locking toggle arms connecting the runner members and the mounting frame and adapted when in extended position to maintain the runner members in functioning position, a releasing rod slidable beneath the mounting frame, means connected with and operated by said releasing rod to unlock the toggle arms to permit the runner members to be raised into nonfunctioning position, means to resiliently retain the releasing rod in unoperated position, and tension means effective only after operation of the releasing rod for collapsing said runner members, standards and toggle arms beneath said mounting frame.

4. Collapsible runners including a mounting frame for attachment to a vehicle, depending standards pivoted to said mounting frame at one end, runner members pivoted to said standards at their other ends, locking toggle arms connecting the runner members and the mounting and adapted when in extended position to maintain the runner members in functioning position, a releasing rod slidable beneath the mounting frame, means connected with and operated by said releasing rod to unlock the toggle arms to permit the runner members to be raised into non-functioning position, means to resiliently retain the releasing rod in unoperated position, tension means effective only after operation of the releasing rod for collapsing said runner members, standards and toggle arms beneath said mounting frame, and guide means for said tension means.

JOHN ANGUS WEIR. [L. S.]
PRESTON JAMES SENTNER. [L. S.]